J. W. SWICKARD.
Cultivators.
No. 136,108.
Patented Feb. 18, 1873.
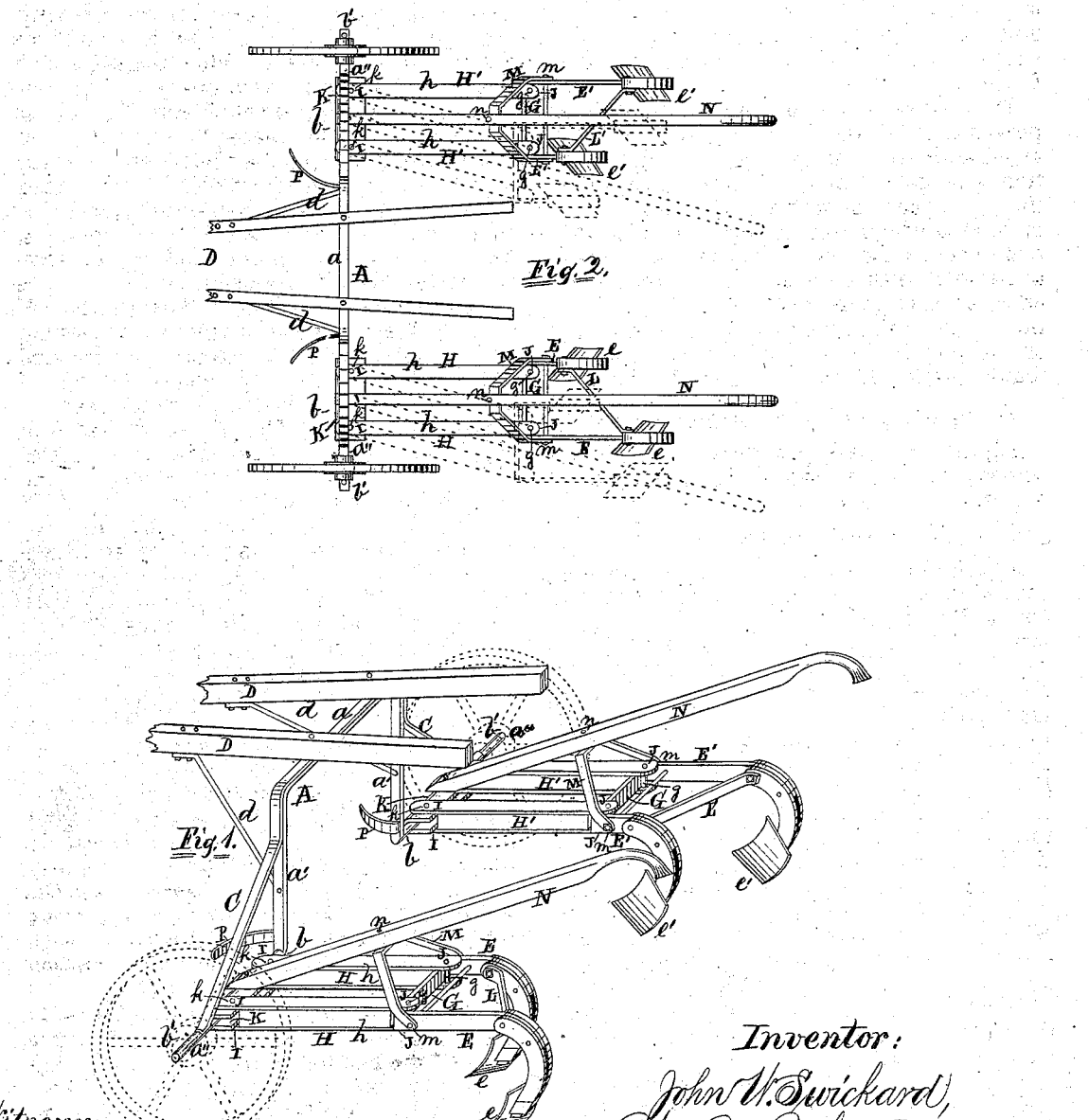
Witnesses:
Platt R. Richards,
M. H. Barringer.
Inventor:
John W. Swickard,
by W. B. Richards,
Atty.

UNITED STATES PATENT OFFICE.

JOHN W. SWICKARD, OF GALVA, ILLINOIS, ASSIGNOR OF ONE-HALF HIS RIGHT TO JOHN HOUGH, OF SAME PLACE.

IMPROVEMENT IN CULTIVATORS.

Specification forming part of Letters Patent No. 136,108, dated February 18, 1873.

*To all whom it may concern:*

Be it known that I, JOHN W. SWICKARD, of Galva, county of Henry, and State of Illinois, have invented certain Improvements in Cultivators, of which the following is a specification:

The nature of my invention relates to improvements in that class of cultivators known as straddle-row cultivators; and the invention consists in a new and improved combination of devices whereby the gangs of plows are more readily operated through the leverage of a pivoted handle, and always kept at the same angle with relation to the line of progression, as hereinafter more fully set forth; and, further, it consists in the arrangement of guards on the vertical parts of the axle, to protect irregular plants, all as hereinafter fully described.

*Description of the Accompanying Drawing.*

Figure 1 is a perspective view of a machine embodying my invention. Fig. 2 is a plan or top view of the same.

*General Description.*

A represents the axle, composed of elevated central portions $a$, vertical side bars $a'$ $a'$, and outwardly-projecting ends $a''$ $a''$, from the lower ends of the side bars $a'$ $a'$, forming journals $b$ $b$ for coupling the plows to the axle, and also spindles $b'$ $b'$, for receiving the supporting-wheels B B. C C are braces extending from the upper part of the vertical side bars $a'$ $a'$ to a point between the journals $b$ $b$ and $b'$ $b'$. D is the draft-pole, secured to the central part of the cross-bar $a$, and braced by rods $d$ $d$ or other suitable devices. E E and E' E' are the plow-beams, as shown in the drawing. They are formed of metallic bars, with their rear ends curved downward, and carrying the shovels $e$ $e$ $e'$ $e'$. The forward end of each pair of plows is connected by a cross-bar, G G.

Wooden or other beams may be used, and the plows attached thereto by any of the ordinary kind of shanks.

H H' are the auxiliary beams, composed each of two parallel bars, $h$ $h$, with beam-plates I I extending from the upper and under side and forward end of each bar $h$, and beam-plates J J extending from their upper and under sides and rear ends. K K are plates partly encircling the journals $b$ $b$, their ends extending back, as shown in the drawing. One pair of bars, $h$ $h$, is pivoted to each of the plates K K by a bolt, $k$, which passes through the upper and lower beam-plates I I and the rearward-projecting sides of plate K; and the two bars $h$ $h$ being placed a short distance apart, their rear ends may be moved laterally or oscillated on the pivot-bolt $k$. The cross-bars G G are pivoted between the plates J J, at the rear end of the bars H H, by bolts $g$ $g$, which work in the angles formed by the cross-bar G and one of the plow-beams E. L L' are braces between each pair of plow-beams. M M are yokes, formed as shown in the drawing, and pivoted at their lower ends to the forward ends of the beam E E by bolts $m$ $m$ $m$ $m$. N N are the plow-handles, by which the operator controls the plows. They are pivoted at their forward ends to the upper side of the plates K K, and pivoted near their centers to the upper side of the yoke M by bolts $n$ $n$. P P are guards, attached to and extending forward from the lower ends of the vertical parts $a'$ $a'$ of the axle A—their forward ends curved outward, as shown in the drawing, in such manner as to catch and direct stalks or hills of plants out of line into and between said elevated parts $a'$ $a'$ in passing.

From an inspection of the drawing it will be plain that the plow-beams E E E' E' are pivoted to the auxiliary beams H H' in such manner that they cannot have either vertical or lateral movement or oscillation without simultaneous movement of the auxiliary beams H H', being held rigidly against vertical oscillation by the flat sides of the bars G G resting against and between the bolts $g$ $g$ and the rear ends of the beams or bars $h$ $h$; and being held rigidly against lateral oscillation by each end of the bar G being secured from vibration at its other end by one of the bolts $g$.

The operation of my invention not already herein described is as follows: By moving either of the handles N N to the right or left the parallel bars H H, with which it is connected, will be oscillated with it; and the forward ends of said bars being retained by the plate K in a line at right angles with the line of progression of the machine, their rear ends will, of course, be retained in a position parallel with their front ends; and the bars G G, being thus kept at all times at right angles with said line of progression, will keep the plow-beams E E parallel with each other and with the line of progression of the machine, as shown by dotted lines at Fig. 2.

Claims.

1. The combination of plates K, bars $h\ h$, and beams E E with the pivoted handles N, substantially as and for the purpose specified.

2. The handles N N and yokes M M, when combined and arranged to operate with the journals $b\ b$, plates K K, bars $h\ h$, and beams E, substantially as described, and for the purpose specified.

3. The guards P P, when combined and arranged to operate with the vertical parts $a'\ a'$ of the axle A substantially as described, and for the purpose specified.

JOHN W. SWICKARD.

Witnesses:
W. H. BARRINGER,
A. W. BERGGREN.